(12) United States Patent
Klein et al.

(10) Patent No.: US 8,989,761 B2
(45) Date of Patent: Mar. 24, 2015

(54) SCHEDULING DATA TRANSMISSIONS IN A MOBILE TELECOMMUNICATION NETWORK

(75) Inventors: Siegfried Klein, Stuttgart (DE); Anton Ambrosy, Tiefenbronn (DE)

(73) Assignee: Alcatel Lucent, Boulogne-Billancourt (FR)

( * ) Notice: Subject to any disclaimer, the term of this patent is extended or adjusted under 35 U.S.C. 154(b) by 6 days.

(21) Appl. No.: 13/877,602

(22) PCT Filed: Aug. 4, 2011

(86) PCT No.: PCT/EP2011/063467
§ 371 (c)(1),
(2), (4) Date: Apr. 3, 2013

(87) PCT Pub. No.: WO2012/045499
PCT Pub. Date: Apr. 12, 2012

(65) Prior Publication Data
US 2013/0210446 A1   Aug. 15, 2013

(30) Foreign Application Priority Data
Oct. 7, 2010   (EP) ..................................... 10290537

(51) Int. Cl.
*H04W 72/00*   (2009.01)
*H04W 72/04*   (2009.01)
(Continued)

(52) U.S. Cl.
CPC .............. *H04W 72/04* (2013.01); *H04W 16/06* (2013.01); *H04W 16/08* (2013.01)
USPC ........... 455/453; 455/443; 455/444; 455/446; 455/449; 455/450; 370/329; 370/330; 370/332; 370/333

(58) Field of Classification Search
CPC ..................... H04W 72/0486; H04W 72/0493; H04W 72/06; H04W 72/08; H04W 72/1278
USPC .......... 455/434, 435.2, 436–453, 9, 520, 522, 455/524, 526, 67.11, 63.4, 63.2, 636.3, 455/562.1; 370/208, 231–235, 314–321, 370/328–334
See application file for complete search history.

(56) References Cited

U.S. PATENT DOCUMENTS 5,974,324 A * 10/1999 Henson ......................... 455/447
7,443,830 B2   10/2008 Engels et al.
(Continued)

FOREIGN PATENT DOCUMENTS

CN   1515094   7/2004
CN   101047940   10/2007
(Continued)

OTHER PUBLICATIONS

International Search Report for PCT/EP2011/063467 dated Sep. 20, 2011.
(Continued)

*Primary Examiner* — Dai A Phuong
(74) *Attorney, Agent, or Firm* — Fay Sharpe LLP

(57) ABSTRACT

The invention relates to a method of communicating in a mobile telecommunication network (100; 200), the mobile telecommunication network comprising a plurality of cells (102; 104; 106), wherein resource blocks are used for transmitting data in the mobile telecommunication network, and wherein the method comprises:—dividing (S2) a resource into at least a first plurality of resource blocks and a second plurality of resource blocks, wherein the resource blocks of the first plurality do not overlap with the resource bocks of the sec¬ond plurality;—assigning (S3) the first plurality of resource blocks to a first group of cells and assigning the second plurality of resource blocks to a second group of cells;—scheduling (S4) first data transmissions in the first group of cells on the first plurality of resource blocks;—scheduling (S5) second data transmissions in the second group of cells on the second plurality of resource blocks;—scheduling (S6) third data transmissions in the first group of cells on the second plurality of resource blocks, when all resource blocks of the first plurality are already used for data transmissions; and—scheduling (S7) fourth data transmissions in the second group of cells on the first plurality of resource blocks, when all resource blocks of the second plurality are already used for data transmissions.

10 Claims, 3 Drawing Sheets

(51) Int. Cl.
*H04W 16/06* (2009.01)
*H04W 16/08* (2009.01)

(56) References Cited

U.S. PATENT DOCUMENTS

| | | | |
|---|---|---|---|
| 8,280,393 B2 * | 10/2012 | Guo et al. | 455/452.2 |
| 2004/0229621 A1 | 11/2004 | Misra | |
| 2006/0193280 A1 * | 8/2006 | Lee et al. | 370/315 |
| 2009/0069023 A1 * | 3/2009 | Ahn et al. | 455/450 |
| 2010/0182972 A1 * | 7/2010 | Katayama et al. | 370/329 |
| 2010/0290435 A1 * | 11/2010 | Kazmi | 370/332 |
| 2011/0009154 A1 | 1/2011 | Ishii | |
| 2011/0013584 A1 * | 1/2011 | Calvanese Strinati et al. | 370/330 |

FOREIGN PATENT DOCUMENTS

| | | |
|---|---|---|
| CN | 101064905 | 10/2007 |
| EP | 0 684 744 A2 | 11/1995 |
| GB | 2 313 254 A | 11/1997 |
| WO | WO 2007115476 | 10/2007 |
| WO | WO 2009/122783 A1 | 10/2009 |

OTHER PUBLICATIONS

Chinese Office Action dated Jan. 22, 2015.

* cited by examiner

SCHEDULING DATA TRANSMISSIONS IN A MOBILE TELECOMMUNICATION NETWORK

FIELD OF THE INVENTION

The invention relates to the field of mobile telecommunication networks, more specifically to scheduling of data transmissions in the mobile telecommunication network.

BACKGROUND AND RELATED ART

In mobile telecommunication networks according to the 3GPP Long Term Evolution (LTE) Standard each base station uses the whole interval for scheduling data transmissions. Every LTE radio cell radiates pilot symbols over the available spectrum. The pilots allow a mobile device to identify a serving cell and to calculate feedback information on its current channel state.

SUMMARY

It is an object of the present invention to provide an improved method of communicating in a mobile telecommunication network, an improved base station, an improved computer readable storage medium, and an improved mobile telecommunication network.

These objects are achieved by the method, the base station apparatus, the computer readable storage medium, and the mobile telecommunication network according to the independent claims. Embodiments of the invention are given in the dependent claims.

The invention relates to a method of communicating in a mobile telecommunication network. The mobile telecommunication network comprises a plurality of cells. Resource blocks are used for transmitting data in the mobile telecommunication network. A resource block is defined by a frequency interval and a time period within a time-frequency continuum. Using a resource block for transmitting data may also be referred to as scheduling data to be transmitted on the resource block. Scheduling data on the resource block means transmitting the data by using the frequency interval defining the respective resource block for the respective time period. The method comprises classifying the plurality of cells into at least a first and a second group of cells. Preferably, the plurality of cells is classified into more than two groups. It is to be noted that two groups is the minimum number of groups.

A resource is divided into at least a first plurality of resource blocks and a second plurality of resource blocks. The resource blocks of the first plurality do not overlap with the resource blocks of the second plurality. The first plurality of resource blocks defines a frequency interval not overlapping with the frequency interval defined by the second plurality of resource blocks. Here, it is also to be noted that two pluralities of resource blocks is the minimum number of pluralities. It is preferred to have at least three pluralities of resource blocks. The number of pluralities of resource blocks corresponds to the number of groups of cells.

The first plurality of resource blocks is assigned to the first group of cells and the second plurality of resource blocks is assigned to the second group of cells.

First data transmissions in the first group of cells are scheduled on resource blocks of the first plurality of resource blocks. Second data transmissions in the second group of cells are scheduled on resource blocks of the second plurality of resource blocks. Interferences in the border regions are avoided by scheduling data transmissions in the different cell groups on different non-overlapping resource blocks. In other words, data transmissions in the first group do not interfere with data transmissions in the second group of cells. This is also why preferably more than two groups of cells are classified. If, for example, the plurality of cells is classified into three groups of cells, there would also be three pluralities of resource blocks, wherein no plurality of resource blocks overlaps with another plurality of resource blocks, and it would be possible that three neighboring cells neighbor each other with reduced interferences.

It is to be noted that the number of resource blocks may be equal for each plurality of resource blocks. Another possibility is that the first plurality for example comprises more resource blocks than the second plurality. This would for example be preferable when there are more data transmissions in the first group of cells expected than in the second group of cells.

Third data transmissions are scheduled in the first group of cells on resource blocks of the second plurality of resource blocks, when all resource blocks of the first plurality are already used for data transmissions. In other words, if more resource blocks are needed for transmitting data in the first group of cells, also the second plurality of resource blocks may be used for scheduling the data transmissions.

Correspondingly fourth data transmissions may be scheduled in the second group of cells on resource blocks of the first plurality of resource blocks. This is the case when all resource blocks of the second plurality are already used for data transmissions, while more resource blocks are needed for transmitting data in the second group of cells.

According to embodiments of the invention orthogonal frequency division multiplexing is used for transmitting data in the mobile telecommunication network.

According to embodiments of the invention the mobile telecommunication network is a network according to the Third Generation Partnership Project (3GPP) Long Term Evolution (LTE) Standard.

According to embodiments of the invention each data transmission uses a corresponding modulation and coding scheme. The modulation and coding scheme used for the respective data transmission determines how much data has to be transmitted for transmitting the information. For example, when a relatively low modulation and coding scheme is used, the amount of data to be transmitted is relatively low. Transmitting the same information with a higher modulation and coding scheme results in transmitting more data. Thus, by changing the modulation and coding scheme the amount of data to be transmitted can be varied.

A load report is generated by a first cell of the first plurality of cells. The load report is indicative of a traffic load in the first cell. The load report is then transmitted from the first cell to a second cell of the second plurality of cells. Thus, the second cell stores information about the traffic load in the first cell. By using the load report the second cell determines, if the modulation and coding scheme of at least one data transmission in the second cell is adjusted or if the modulation and coding scheme of the at least one data transmission in the second cell is not adjusted. If, for example the traffic load in the first cell is relatively high, the second cell determines to adjust the modulation and coding scheme to a lower modulation and coding scheme, which results in less data to be transmitted. This may for example be performed for avoiding the use of the first plurality of resource blocks in the second cell. If the first plurality of resource blocks would be used at the same time in the first and the second cell, interferences in the border region of the first and the second cell could disturb data transmissions in the first and in the second cell.

For example, if the load report indicates a relatively low traffic load in the first cell, the second cell may decide to keep the modulation and coding scheme or to even choose a higher modulation and coding scheme, which results in more data to be transmitted. In the latter case the second cell may use resource blocks of the first plurality of resource blocks for data transmissions, because the first plurality of resource blocks is not completely used by the first cell. Thus, the second cell may use resource blocks of the first plurality of resource blocks for data transmissions in the second cell.

Additionally or alternatively, the transmit power of the at least one data transmission in the second cell may be adjusted by using the load report. For example if the highest modulation and coding scheme is already used for data transmissions in the second cell and resource blocks of the second plurality of resource blocks are not yet used for data transmissions in the second cell, the transmit power in the second cell for the data transmissions may be decreased. This is advantageous for avoiding interferences with data transmissions in neighboring cells. When the transmit power for data transmissions in the second cell is decreased, more resource blocks are used for the data transmissions. Thus, the transmit power is preferably decreased as long as resource blocks of the second plurality of resource blocks are not yet used for data transmissions in the second cell.

According to embodiments of the invention the modulation and coding scheme and/or the transmit power is adjusted by using the load report, channel quality information, and/or uplink information. Uplink information may for example by used when time division duplex is used for data transmission in the second cell. Channel quality information may for example be a channel quality indicator (CQI) according to the 3GPP LTE Standard. The CQI information is used by the radio cell controller's scheduler to allocate transmission resources to mobiles for transmission of user data in downlink direction.

In general the CQI corresponds well to a completely loaded mobile telecommunication network, because it considers the pilot symbols of all cells to estimate the channel capacity. In practice, the radio access network is rarely fully loaded and therefore only a subset of the available resources is used for data transmission, which leads to a systematic underestimation of the channel state for data transmission. This systematic underestimation of the radio channel for data transmission is caused by unused resources in neighboring cells.

The CQI information is used by the radio cell controller's scheduler to allocate transmission resources to mobiles for transmission of user data in downlink direction. The scheduler may employ various techniques to associate suitable radio resources to a mobile. Scheduling data transmissions on suitable resource blocks may for example be performed by a frequency selective resource association based on pilot feedback. The frequency selective resource association finds the resource blocks providing the most favorable channel conditions.

Another possibility is for example a random selection of resources. This reduces the interference of data transmission in neighboring radio cells.

Typically link adaptation selects a modulation and coding scheme for transmission of user data. It may compensate the systematic error outlined above to reduce the transmission power for the data transmission or to employ a modulation and coding scheme transporting more user data.

According to embodiments of the invention the resource is divided into the at least first and second plurality by a central network entity. The central network entity may for example be an operation and maintenance center. The resource may for example be a frequency interval defined to be used by the mobile telecommunication network. Alternatively the resource may also be divided into the at least first and second plurality by a plurality of base stations of the mobile telecommunication network. The plurality of base stations exchange signals for determining if a symmetrical or asymmetrical division of the resource is preferred. For this purpose the traffic load in the respective cells served by the plurality of base stations is taken into account. If, for example, in the first plurality of cells the traffic load is significantly higher than in the second plurality of cells, the first plurality of resource blocks comprises more resource blocks than the second plurality of resource blocks. In other words, load reports are used for determining if a symmetrical or asymmetrical division of the resource is preferred.

According to embodiments of the invention the resource is divided into the at least first and second plurality by the plurality of cells. Dividing is performed by exchanging signals between base stations of the cells. The signals are indicative of the at least first and second resource blocks.

The base station apparatus further comprises means for scheduling second data transmissions. The second data transmissions are scheduled on resource blocks of a second plurality of resource blocks, when all resource blocks of the first plurality of resource blocks are already used for data transmissions. The resource blocks of the first plurality do not overlap with the resource blocks of the second plurality. This may also be performed by the scheduler of the base station apparatus. The scheduler may be implemented by a processor executing program instructions.

In yet another aspect the invention relates to a computer readable storage medium comprising instructions that when executed by a base station apparatus cause the base station apparatus to perform a method of communicating in a mobile communication network. The mobile communication network comprises a plurality of cells. Resource blocks are used for transmitting data in the mobile telecommunication network. The method comprises scheduling first data transmissions. The first data transmissions are scheduled on resource blocks of a first plurality of resource blocks. Second data transmissions are scheduled on resource blocks of a second plurality of resource blocks, when all resource blocks of the first plurality are already used for data transmissions. The resource blocks of the first plurality do not overlap with the resource blocks of the second plurality.

In yet another aspect the invention relates to a mobile telecommunication network comprising a plurality of base station apparatus according to embodiments of the invention and the mobile telecommunication network is adapted to perform a method according to embodiments of the invention.

BRIEF DESCRIPTION OF THE DRAWINGS

In the following preferred embodiments of the invention will be described, by way of example only, and with reference to the drawings in which.

DETAILED DESCRIPTION

Like numbered elements in these Figs. are either identical elements or perform the same function. Elements which have been discussed previously will not necessarily be discussed in later Figs. if the function is identical.

Figure 1:
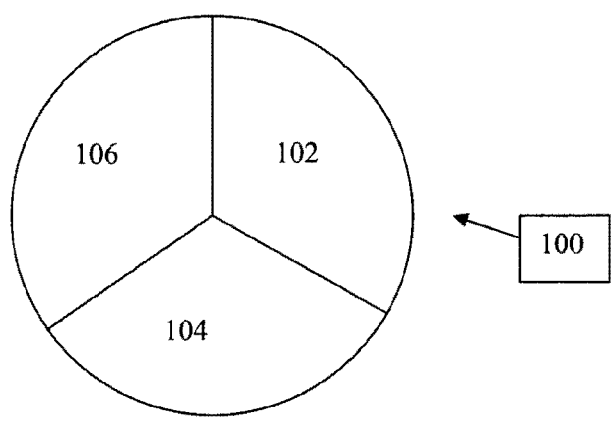
FIG. 1 is a schematic view of a mobile telecommunication network comprising a plurality of cells.

FIG. 1 is a schematic view of a mobile telecommunication network 100 comprising a plurality of cells 102, 104 and 106. The frequency band to be used for data transmissions in the mobile telecommunication network 100 is divided into three pluralities of resource blocks. The pluralities of resource blocks may comprise the same number of resource blocks or the resource blocks may be distributed asymmetrically over the pluralities of resource blocks. For example if a high traffic load is expected in cell 102, the first plurality of resource blocks being assigned to cell 102 comprises more resource blocks than the second and the third plurality of resource blocks. The first, the second, and the third plurality of resource blocks do not overlap. This means, that a resource block comprised by the first plurality of resource blocks may not be comprised by the second and the third plurality of resource blocks. Interferences in the border region of the cells 102, 104 and 106 are avoided by using the first plurality of resource blocks in cell 102, the second plurality of resource blocks in cell 104 and the third plurality of resource blocks in 106 for scheduling data transmissions in the respective cell.

For example if the traffic load in cell 102 raises and the use of more resource blocks than comprised by the first plurality of resource blocks is necessary, additional resource blocks from the second or the third plurality of resource blocks may be used for scheduling data transmissions in the cell 102. Additionally or alternatively, the modulation and coding scheme used in cell 102 for data transmissions may be adjusted such that less data is transmitted for transmitting the same amount of information. In other words, it is possible to lend or borrow resource blocks from the second or third plurality of resource blocks for data communication in cell 102. The same applies correspondingly for cells 104 and 106. The base stations of the cells 102-106 may exchange signals for exchanging load reports being indicative of the traffic load in the respective cell. By doing so cell 102 stores information about the traffic load in cells 104 and 106. Cell 104 stores information about traffic loads in cells 102 and 106 and cell 106 stores information about traffic load in cells 102 and 104.

The signals exchanged between the base stations of the cells 102-106 may alternatively be transmitted to a central network entity (not depicted in FIG. 1). The central network entity may then distribute the signals to the other base stations and/or the central network entity may decide to adjust the modulation and coding scheme in one or more cells and/or the central network entity may determine the number of resource blocks comprised by the first, the second and the third plurality of resource blocks.

Also the transmit power being used in cells 102-106 may be adjusted according to the traffic loads in cells 102-106. For example if the traffic load in cell 104 is relatively low and resource blocks of the second plurality are not used for data transmissions and the highest modulation and coding is used in cell 104, the transmit power for data transmissions in cell 104 may be decreased and the number of resource blocks used for data transmissions may be increased. Using the highest modulation and coding scheme means that the modulation and coding scheme with the best signal transmission quality and the highest amount of transmitted data is used. By decreasing the transmit power and increasing the used number of resource blocks the transmission quality is kept constant and interferences with neighboring base stations are reduced.

Figure 2:
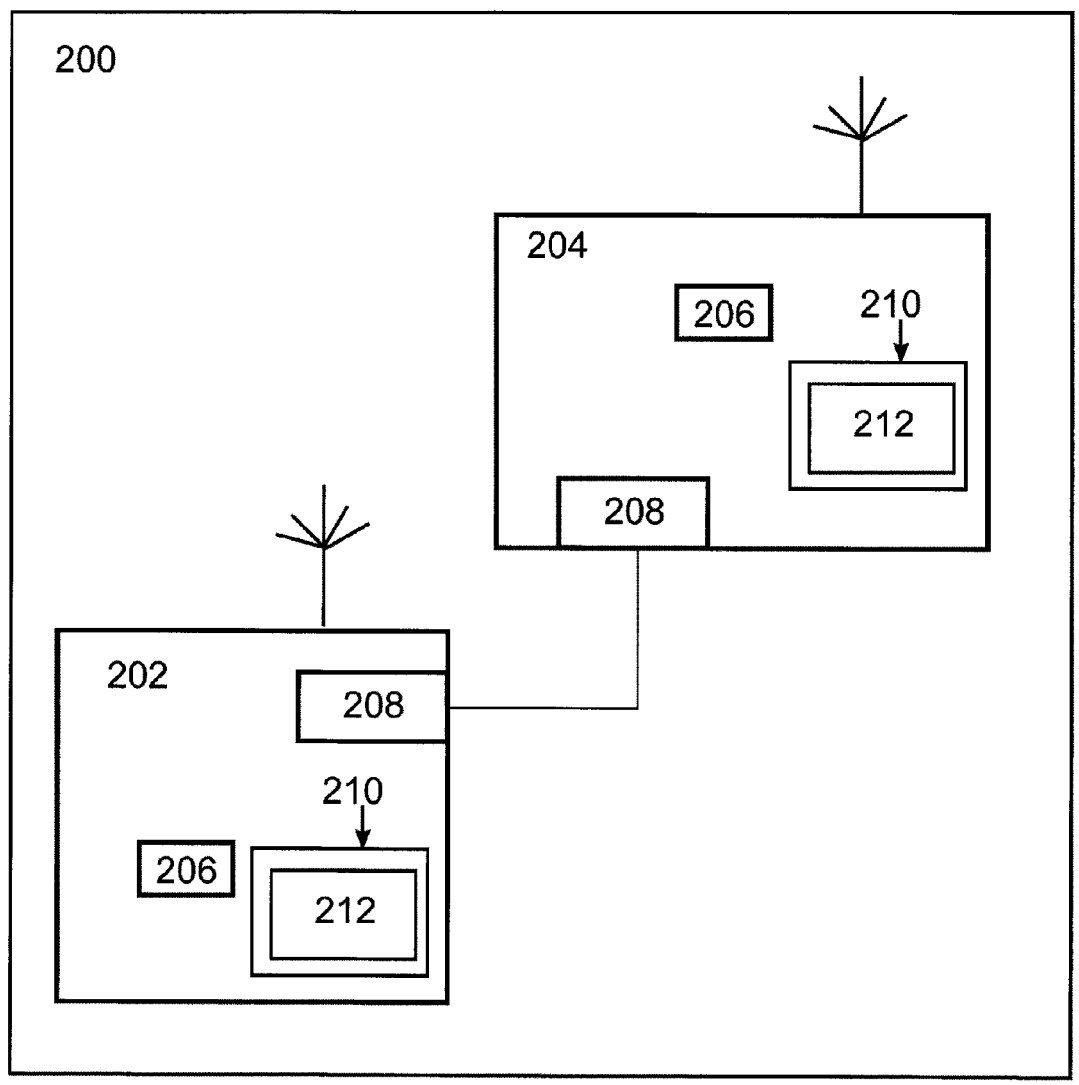
FIG. 2 is a block diagram of a mobile telecommunication network comprising a plurality of base stations.

FIG. 2 is a block diagram of a mobile telecommunication network 200 comprising a first base station 202 and a second base station 204. The mobile telecommunication network 200 may comprise more base stations, although only two base stations are depicted for simplicity reasons.

Each base station 202 and 204 comprises a scheduler 206. The scheduler may for example be a processor being adapted for executing program instructions. The base stations 202 and 204 further comprise an interface 208. Via interface 208 the base station 202 may communicate with base station 204. Communication between base stations 202 and 204 may be advantageous for determining traffic load in the cell of base station 204 by base station 202. The same applies vice versa for base station 204. The base stations 202 and 204 further each comprise a computer-readable storage medium 210 comprising instructions 212.

In operation, the scheduler 206 executes the instructions 212. The base station 202 is caused by scheduler 206 to schedule data transmissions in the respective cell on resource blocks of a first plurality of resource blocks. The scheduler 206 further causes the base station 202 to schedule second data transmissions on resource blocks of a second plurality of resource blocks, when all resource blocks of the first plurality are already used for data transmissions. The resource blocks of the first plurality do not overlap with the resource blocks of the second plurality. The second base station 204 is caused by scheduler 206 of the second base station 204 to schedule third data transmissions on the second plurality of resource blocks and to schedule fourth data transmissions on the first plurality of resource blocks, when all resource blocks of the second plurality are already used for data transmissions in the respective cell.

Figure 3:
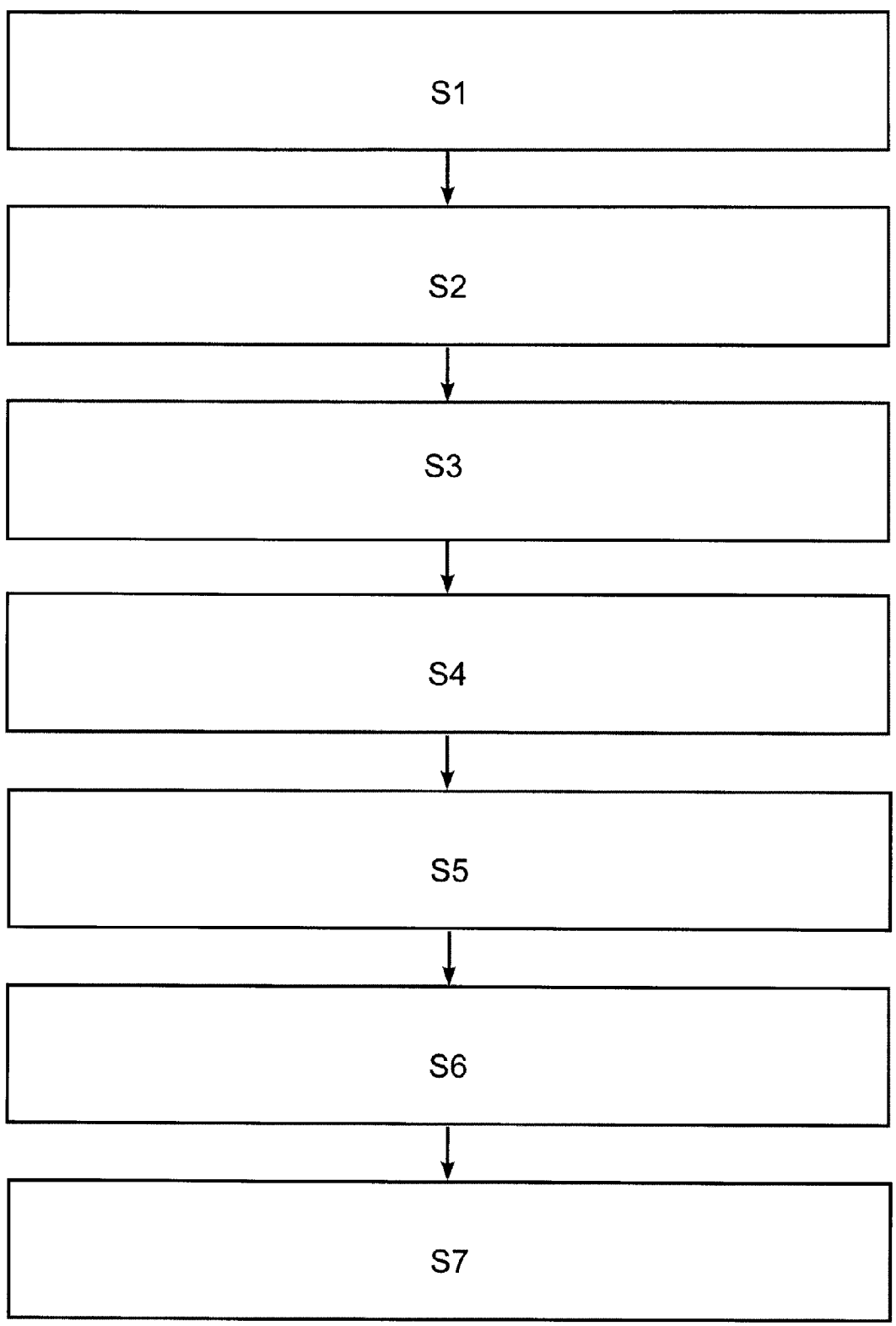
FIG. 3 is a flow diagram of a method according to embodiments of the invention.

FIG. 3 is a flow diagram of a method according to embodiments of the invention. In a first step S1 the plurality of cells of the mobile telecommunication network is classified into at least a first and a second group of cells. A resource, which is preferably a frequency interval, is divided into at least a first and a second plurality of resource blocks. The resource blocks of the first plurality do not overlap with the resource blocks of the second plurality. This is in FIG. 2 the second step S2.

The first plurality of resource blocks is preferably used in the first group of cells in step S3 for scheduling data transmissions in the first group of cells. The second plurality of resource blocks is preferably used in the second group of cells for scheduling data transmissions in the second group of cells. Scheduling first data transmissions in the first group of cells is performed in step S4, while scheduling second data transmissions in the second group of cells is scheduled in step S5.

For example if more data needs to be transmitted in the first group of cells, third data transmissions are scheduled on resource blocks of the second plurality of resource blocks. This may result in interferences with neighboring cells. But the data throughput in the first group of cells may anyhow be increased by this scheduling in step S6. Correspondingly in step S7 fourth data transmissions may be scheduled in the second group of cells on resource blocks of the first plurality of resource blocks.

| List of Reference Numerals | |
| --- | --- |
| 100 | Mobile telecommunication network |
| 102 | Cell |
| 104 | Cell |
| 106 | Cell |
| 200 | Mobile telecommunication network |
| 202 | Base station |
| 204 | Base station |
| 206 | Scheduler |
| 208 | Interface |

| | |
|---|---|
| 210 | Storage medium |
| 212 | Instructions |

The invention claimed is:

1. A method of communicating in a mobile telecommunication network, the mobile telecommunication network comprising a plurality of cells wherein resource blocks are used for transmitting data in the mobile telecommunication network, and wherein the method comprises:
- classifying the plurality of cells into at least a first and a second group of cells;
- dividing a resource into at least a first plurality of resource blocks and a second plurality of resource blocks, wherein the resource blocks of the first plurality do not overlap with the resource bocks of the second plurality;
- assigning the first plurality of resource blocks to the first group of cells and assigning the second plurality of resource blocks to the second group of cells;
- scheduling first data transmissions in the first group of cells, wherein the first data transmissions are scheduled on resource blocks of the first plurality of resource blocks;
- scheduling second data transmissions in the second group of cells, wherein the second data transmissions are scheduled on resource blocks of the second plurality of resource blocks;
- scheduling third data transmissions in the first group of cells, wherein the third data transmissions are scheduled on resource blocks of the second plurality of resource blocks, when resource blocks of the first plurality are already used for data transmissions;
- scheduling fourth data transmissions in the second group of cells, wherein the fourth data transmissions are scheduled on resource blocks of the first plurality of resource blocks, when resource blocks of the second plurality are already used for data transmissions;
- wherein the data transmissions use a corresponding modulation and coding scheme;
- generating a load report by a first cell of the first plurality of cells, the load report being indicative of a traffic load in the first cell;
- transmitting the load report from the first cell to a second cell of the second plurality of cells;
- adjusting the modulation and coding scheme of at least one data transmission in the second cell by using the load report; and
- adjusting the transmit power of the at least one data transmission in the second cell by using the load report.

2. Method according to claim 1, wherein orthogonal frequency division multiplexing is used for transmitting data in the mobile telecommunication network.

3. Method according to claim 2, wherein the mobile telecommunication network is a network according to the 3GPP Long Term Evolution standard.

4. Method according to claim 2, wherein adjusting the modulation and coding scheme and/or adjusting the transmit power is performed by using the load report, channel quality information, and/or uplink information.

5. Method according to claim 2, wherein the resource is divided into the at least first and second plurality by a central network entity.

6. Method according to claim 2, wherein the resource is divided into the at least first and second plurality by the plurality of cells, dividing being performed by exchanging signals between base stations of the cells, the signals being indicative of the at least first and second plurality of resource blocks.

7. Method according to claim 2, wherein the first plurality comprises more resource blocks than the second plurality.

8. A base station apparatus, wherein the base station apparatus comprises one or more processors configured to:
- classify a plurality of cells into at least a first and a second group of cells;
- divide a resource into at least a first plurality of resource blocks and a second plurality of resource blocks, wherein the resource blocks of the first plurality do not overlap with the resource bocks of the second plurality;
- assign the first plurality of resource blocks to the first group of cells and assign the second plurality of resource blocks to the second group of cells;
- schedule first data transmissions, wherein the first data transmissions are scheduled on resource blocks of a first plurality of resource blocks;
- schedule second data transmissions, wherein the second data transmissions are scheduled on resource blocks of a second plurality of resource blocks, when resource blocks of the first plurality are already used for data transmissions, and wherein the resource blocks of the first plurality do not overlap with the resource bocks of the second plurality of resource blocks;
- schedule third data transmissions in the first group of cells, wherein the third data transmissions are scheduled on resource blocks of the second plurality of resource blocks, when resource blocks of the first plurality are already used for data transmissions;
- schedule fourth data transmissions in the second group of cells, wherein the fourth data transmissions are scheduled on resource blocks of the first plurality of resource blocks, when resource blocks of the second plurality are already used for data transmissions;
- wherein the data transmissions use a corresponding modulation and coding scheme;
- generate a load report by a first cell of the first plurality of cells, the load report being indicative of a traffic load in the first cell;
- transmit the load report from the first cell to a second cell of the second plurality of cells; and
- adjust the modulation and coding scheme of at least one data transmission in the second cell by using the load report; and/or
- adjust the transmit power of the at least one data transmission in the second cell by using the load report.

9. A non-transitory computer-readable storage medium comprising instructions that when executed by a base station apparatus cause the base station apparatus to perform a method of communicating in a mobile telecommunication network, the mobile telecommunication network comprising a plurality of cells, wherein resource blocks are used for transmitting data in the mobile telecommunication network, and wherein the method comprises:
- classifying the plurality of cells into at least a first and a second group of cells;
- dividing a resource into at least a first plurality of resource blocks and a second plurality of resource blocks, wherein the resource blocks of the first plurality do not overlap with the resource bocks of the second plurality;
- assigning the first plurality of resource blocks to the first group of cells and assigning the second plurality of resource blocks to the second group of cells;

scheduling first data transmissions, wherein the first data transmissions are scheduled on resource blocks of a first plurality of resource blocks;

scheduling second data transmissions, wherein the second data transmissions are scheduled on resource blocks of a second plurality of resource blocks, when resource blocks of the first plurality are already used for data transmissions, and wherein the resource blocks of the first plurality do not overlap with the resource bocks of the second plurality scheduling third data transmissions in the first group of cells, wherein the third data transmissions are scheduled on resource blocks of the second plurality of resource blocks, when resource blocks of the first plurality are already used for data transmissions;

scheduling fourth data transmissions in the second group of cells, wherein the fourth data transmissions are scheduled on resource blocks of the first plurality of resource blocks, when resource blocks of the second plurality are already used for data transmissions;

wherein the data transmissions use a corresponding modulation and coding scheme;

generating a load report by a first cell of the first plurality of cells, the load report being indicative of a traffic load in the first cell;

transmitting the load report from the first cell to a second cell of the second plurality of cells; and adjusting the modulation and coding scheme of at least one data transmission in the second cell by using the load report; and/or adjusting the transmit power of the at least one data transmission in the second cell by using the load report.

10. A mobile telecommunication network, the mobile telecommunication network comprising a plurality of base station apparatuses according to claim 8.

* * * * *